United States Patent
Rasal et al.

(10) Patent No.: US 11,938,757 B2
(45) Date of Patent: Mar. 26, 2024

(54) WHEEL SUSPENSION SYSTEM

(71) Applicant: RUT3 Engineering Pvt. Ltd., Maharashtra (IN)

(72) Inventors: Mitesh Rasal, Maharashtra (IN); Shubham Sutar, Maharashtra (IN); Suraj Ettam, Maharashtra (IN)

(*) Notice: Subject to any disclaimer, the term of this patent is extended or adjusted under 35 U.S.C. 154(b) by 0 days.

(21) Appl. No.: 18/173,812

(22) Filed: Feb. 24, 2023

(65) Prior Publication Data

US 2023/0356542 A1   Nov. 9, 2023

Related U.S. Application Data

(63) Continuation of application No. PCT/IN2022/051077, filed on Dec. 15, 2022.

(51) Int. Cl.
*B60B 9/04* (2006.01)
*B60B 1/14* (2006.01)
*B60B 9/26* (2006.01)
*B60B 21/06* (2006.01)
*B60B 27/00* (2006.01)

(52) U.S. Cl.
CPC ............... *B60B 9/04* (2013.01); *B60B 1/14* (2013.01); *B60B 9/26* (2013.01); *B60B 21/06* (2013.01); *B60B 27/00* (2013.01); *B60B 2900/313* (2013.01); *B62K 2201/06* (2013.01)

(58) Field of Classification Search
CPC .... B60B 9/04; B60B 9/08; B60B 9/26; B60B 1/14; B60B 21/06
See application file for complete search history.

(56) References Cited

U.S. PATENT DOCUMENTS

| | | | | |
|---|---|---|---|---|
| 407,266 | A * | 7/1889 | West | B60B 9/26 301/84 |
| 780,370 | A * | 1/1905 | Munsing | B60B 9/26 152/84 |
| 1,021,440 | A * | 3/1912 | Arnold et al. | B60B 9/26 152/84 |
| 1,073,368 | A * | 9/1913 | Smith | B60B 9/26 152/376 |
| 1,179,974 | A * | 4/1916 | Strietelmeier | B60B 9/26 152/84 |
| 1,336,031 | A * | 4/1920 | Gebhardt | B60B 9/26 152/85 |
| 2016/0107497 | A1 | 4/2016 | Paulding | |
| 2018/0100556 | A1 | 4/2018 | Love | |

* cited by examiner

*Primary Examiner* — Kip T Kotter
(74) *Attorney, Agent, or Firm* — Kevin J Fournier Intellectual Property Legal Services Ltd.; Kevin J Fournier

(57) ABSTRACT

A wheel suspension system, comprising, a wheel rim, a plurality of adaptors equidistantly mounted on inner periphery of the wheel rim, a plurality of suspension curved elastic members having drafted ends configured to be circumferentially and linearly disposed into the adaptor along the wheel rim, and a multi-layered hub having a plurality of interlocked holders away from its centre towards the wheel rim for interlocking the elastic members at the centre. The wheel suspension system is cost effective for both users and manufacturers, user friendly, comfortable, easy to assemble or disassemble, comfortable and provides safety in cases of accidents.

14 Claims, 8 Drawing Sheets

WHEEL SUSPENSION SYSTEM

FIELD OF THE DISCLOSURE

The present disclosure relates to a wheel suspension system. More particularly, the present disclosure relates to a multi-axial wheel suspension system.

BACKGROUND OF THE DISCLOSURE

Background description includes information that may be useful in understanding the present disclosure. It is not an admission that any of the information provided herein is prior art or relevant to the present disclosure, or that any publication specifically or implicitly referenced is prior art.

It has been seen in the conventional wheels that spokes which are multiple in number or solid/mag spokes are used. Spokes are assembled in multiple holes in a rim ultimately increases weight of the wheel, when such wheels are used in a bicycle, wheelchairs or any similar kind of vehicle, the vehicle becomes heavy, and which further negatively impacts overall efficiency of the vehicle as the metallic spokes in rim acts as a highly ineffective suspension.

In these conventional heavy wheels, a separate suspension system needs to be arranged which is having single axis motion system having a greater number of joints, therefore, making its part replacement difficult and also adding additional cost in the replacement. The assembly of such wheels are not user friendly due to high number of spokes provided in the rim, instead in case of every small maintenance, the user would have to engage a mechanic, which is inconvenient and time and money consuming for the user. The single axis motion system does not provide enough safety in cases of accidents. Such suspension system also requires regular maintenance of air and oil.

Further, the process of assembly between rim and spokes to form the entire wheel suspension is time consuming as it involves wheel alignment, tightening of spokes from hub to rim end. Also, the suspension mountings requiring extra parts are again welded, bolted through joint using different process, leading to overall increasing paint area, finishing process, labor work and ultimately making it cost ineffective.

Further, riding vehicles having such conventional spoke suspension system also causes back injuries to the rider, hence, making the riding experience uncomfortable. There are issues been reported about breakdown in vehicle's fork due to the above inefficient single axis suspension system. The chassis of vehicle of such a suspension system is not uni-structure, there are joints like swing arm assemble which prevents uniform load transfer, thereby, reducing chassis life. The chassis life is also impacted by high vibrations, which very often results in breakage of the joints, welds of the chassis, again increasing cost of repair and time. It has also been seen that connection of spokes having slots at its end with the wheel hub is also not reliable and has tendency to break after a few running cycles of the wheel.

There have been problems at the manufacturer end as with regard to the conventional wheel suspension system. Due to the complicated structure, retrofitting the wheel in Wheelchairs, Bicycles, Two-wheelers, Space rovers, toys, Drones is not easy and also involves joining process such as welding, riveting and bolting, and separate mechanisms such as swing arm, bolts, bushes, new joints/welding and nuts. All these steps ultimately amount to increased labor and manufacturing cost for assembly, more time consuming. The materials used in the manufacturing of such conventional suspension system and usage of excess carbon footprint further adds additional cost and because of this, the manufacturers and the end users are remains dissatisfied.

However, many challenges are still there. Some solutions are provided where springs are used in the suspension system for wheel to provide comfort to the rider and reduce the weight of the wheel, but still due the complicated structure and inefficient engineering of the conventional suspension system, the weight of the wheel is still a major problem and that is the reason why running efficiency of the vehicle is affected.

It would be desirable, therefore, to develop an improved single wheel suspension system which is light-weight, structurally simple, easy to manufacture, low cost, efficient in functioning and having long life, and obviates challenges that exists in the prior arts as mentioned above.

SUMMARY OF THE DISCLOSURE

The various objectives and embodiments of the present disclosure as presented herein are understood to be illustrative of the present disclosure and not restrictive thereof and are non-limiting with respect to the scope of the disclosure.

It is an object of the present disclosure to provide a wheel suspension system which is highly efficient and light weight.

Another objective of the present disclosure is to provide a wheel suspension system which is simple in structure, maintenance friendly and easy to assemble.

Another objective of the present disclosure is to provide a wheel suspension system which is safe even in cases of accidents.

Another objective the present disclosure is to provide a wheel suspension system which can be manufactured at a low cost.

It is one of the objectives of the present disclosure to provide a wheel suspension system that avoids use of oil and air suspensions in wheelchairs, bicycle and other similar vehicles.

It is one of the objectives of the present disclosure to provide a wheel suspension system whose manufacturing reduces carbon footprints.

It is one of the objectives of the present disclosure to provide a wheel suspension system having an improved load bearing capacity, thereby helping systems like Wheelchairs qualify for market acceptance.

It is one of the objectives of the present disclosure to provide a wheel suspension system which is having a long service life.

In accordance with one embodiment of the present disclosure, there is provided a wheel suspension system, comprising a wheel rim, a plurality of adaptors having at least two receivers, equidistantly mounted on inner periphery of the wheel rim, a plurality of suspension curved elastic members each having at least two drafted ends, wherein one end of each of the member is configured to be circumferentially and linearly disposed into the receiver of the adaptor along the wheel rim, and a multi-layered hub configured to comprise a plurality of interlocked holders away from its centre towards the wheel rim for interlocking another end of the elastic members.

In accordance with another embodiment of the present disclosure, there is provided a wheel suspension system, comprising a wheel rim, a plurality of adaptors having at least two receivers, equidistantly mounted on inner periphery of the wheel rim, a plurality of suspension curved elastic members each having at least two drafted ends, wherein one end of each of the member is configured to be circumferentially and linearly disposed into the receiver of the adaptor along the wheel rim, and a multi-layered hub configured to comprise a plurality of interlocked holders away from its centre towards the wheel rim for interlocking another end of the elastic members, wherein said ends of the suspension curved elastic members are having a thickness/width greater or lesser than the thickness/width of remaining portion of the elastic member for interlocking the suspension member with the hub and adaptor.

In accordance with another embodiment of the present disclosure, there is provided a wheel suspension system, comprising a wheel rim, a plurality of adaptors having at least two receivers, equidistantly mounted on inner periphery of the wheel rim, a plurality of suspension curved elastic members each having at least two drafted ends, wherein one end of each of the member is configured to be circumferentially and linearly disposed into the receiver of the adaptor along the wheel rim, and a multi-layered hub configured to comprise a plurality of interlocked holders away from its centre towards the wheel rim for interlocking another end of the elastic members, wherein said ends of the suspension curved elastic members are having a width or thickness greater or lesser than the thickness or width of slot of the holder and groove of the receiver of the adaptor for interlocking the suspension member with the hub and adaptor.

In accordance with one of the above embodiments of the present disclosure, wherein said suspension curved elastic member is having varying thickness along its circumference.

In accordance with one of the above embodiments of the present disclosure, said suspension curved elastic member is having varying width along its circumference.

In accordance with one of the above embodiments of the present disclosure, wherein said ends of the suspension curved elastic members are provided with one or more slits complementary to the structure of receiver of the adaptor and slot of the holder for interlocking the suspension member with the hub and adaptor, wherein said interlocked holder is having two slots in different plane for fixing the ends of the suspension curved elastic members.

In accordance with one of the above embodiments of the present disclosure, wherein said suspension curved elastic member is designed in C-shape with variable thickness along its circumference and variable thickness along its width.

In accordance with one of the above embodiments of the present disclosure, wherein a pair of the suspension curved elastic members are oppositely arranged and disposed oppositely into their respective receivers of the same adaptor and interlocked holder.

In accordance with one of the above embodiments of the present disclosure, wherein the pair of the suspension curved elastic members when disposed oppositely into their respective receivers of the same adaptor and the interlocked holder, together forms an elliptical structure between the wheel rim and the hub.

In one implementation of the present disclosure, there is provided a wheel suspension system, comprising a wheel rim, a plurality of adaptors having at least two receivers, equidistantly mounted on inner periphery of the wheel rim, a plurality of suspension curved elastic members each having at least two ends, wherein one end of each of the member is configured to be circumferentially and then linearly disposed into the receiver of the adaptor along the wheel rim, and a multi-layered hub configured to comprise a plurality of interlocked holders away from its centre towards the wheel rim for interlocking another end of the elastic members, wherein said hub is configured to mount a brake and/or gears and/or sprocket arrangement.

In accordance with one embodiment of the present disclosure, there is provided a multi-layered hub for a wheel having a rim, comprising a plurality of interlocked holders having one or more slots, extending away from centre of the hub for interlocking one or more ends of one or more of suspension members disposed in plane of the wheel between the rim and hub.

In accordance with one embodiment of the present disclosure, there is provided an adaptor for a wheel having a rim, comprising a male member and a female member, each having a leg affixed on to the rim or both legs affixed, wherein said leg of each member are joined to each other via one or more common fastening means in order to be adjacently situated on the rim, and a top member fixedly attached to the leg and provided with slots for fixing one or more suspension member of the wheel, wherein, height of said leg of the male and female members vary according to the required diameter of the wheel.

These and other embodiments, processes and features of the disclosure will become more fully apparent when the following detailed description is read with the accompanying drawing figures. However, both the foregoing summary of the disclosure and the following detailed description of it represent one potential embodiment and are not restrictive of the disclosure or other alternate embodiments of the disclosure.

BRIEF DESCRIPTION OF THE DRAWINGS

To illustrate the solutions according to the embodiments of the present disclosure more clearly, the accompanying drawings needed for describing the embodiments are introduced below briefly. Apparently, the accompanying drawings in the following descriptions merely show some of the embodiments of the present disclosure, and persons skilled in the art may obtain other drawings according to the accompanying drawings without creative efforts.

DETAILED DESCRIPTION OF THE DISCLOSURE

In the present disclosure, a conventional rim is used, wherein the conventional wheel spoke system is replaced with a multi-axial suspension system in the wheel, wherein the multi-axial suspension system consists of 3 sets of elastic springs, wherein each set is having 2 C shaped springs combining to result in one set of ellipse located between the hub and rim of the wheel, wherein each spring is held by the hub at its center from one of its ends and the other end of the spring is disposed into the adaptor situated along the circumference of the rim.

The hub is designed to be bolted at three points and hold six ends of springs or suspension member at the center. Similarly, there are three adaptors in one rim, wherein each adaptor holds other two ends of the spring. This entire assemble of one hub, three adaptors and six C shaped springs in the manner mentioned above forms an integrated structure with the rim to produce a multi-axial suspension action in a wheel.

As mentioned above, in the integrated wheel suspension system, the wheel usually has the conventional tyre assembled on the rim, wherein when the wheel is made to run on ground, whenever the wheel comes across a obstacle, the springs placed in the wheel is compressed and expanded, hence providing suspension action, wherein the hub shifts along with spring action and get back to its original position after completing the spring action. This overall action provides suspension action within the wheel itself. The forces of impacts, vibrations are resolved inside the rim by the suspension springs thus providing high comfort by reducing the load transfer to the human body, improves the chassis and joint/welds life by reducing the impacts, vibrations coming to vehicle chassis. When hub gets back to its original position, it also provides a forward movement, which further reduces the effort to drive by means of pedalling, battery, petrol/diesel.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
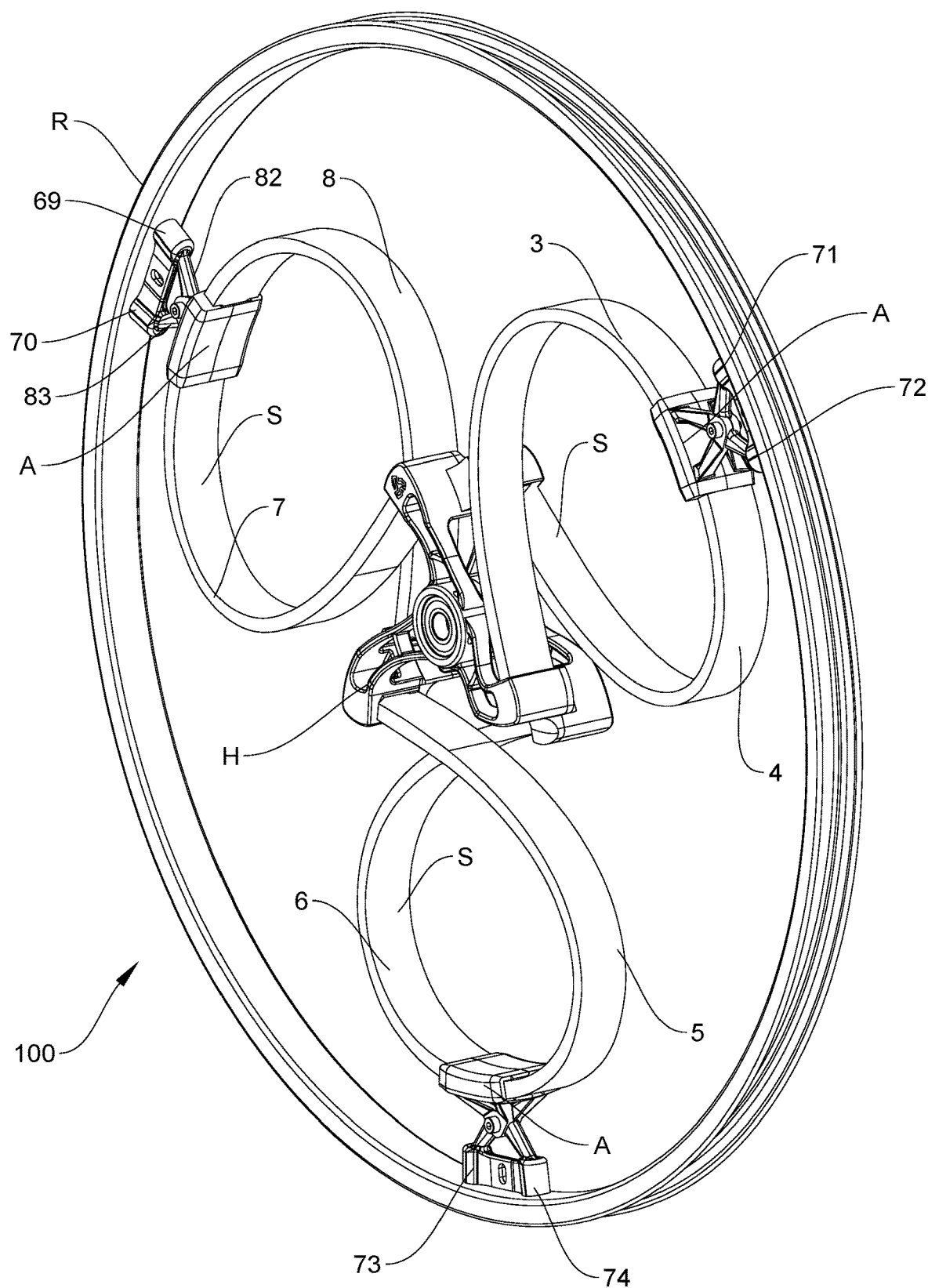
FIG. 1 illustrate perspective view of the wheel suspension system.
Figure 2:
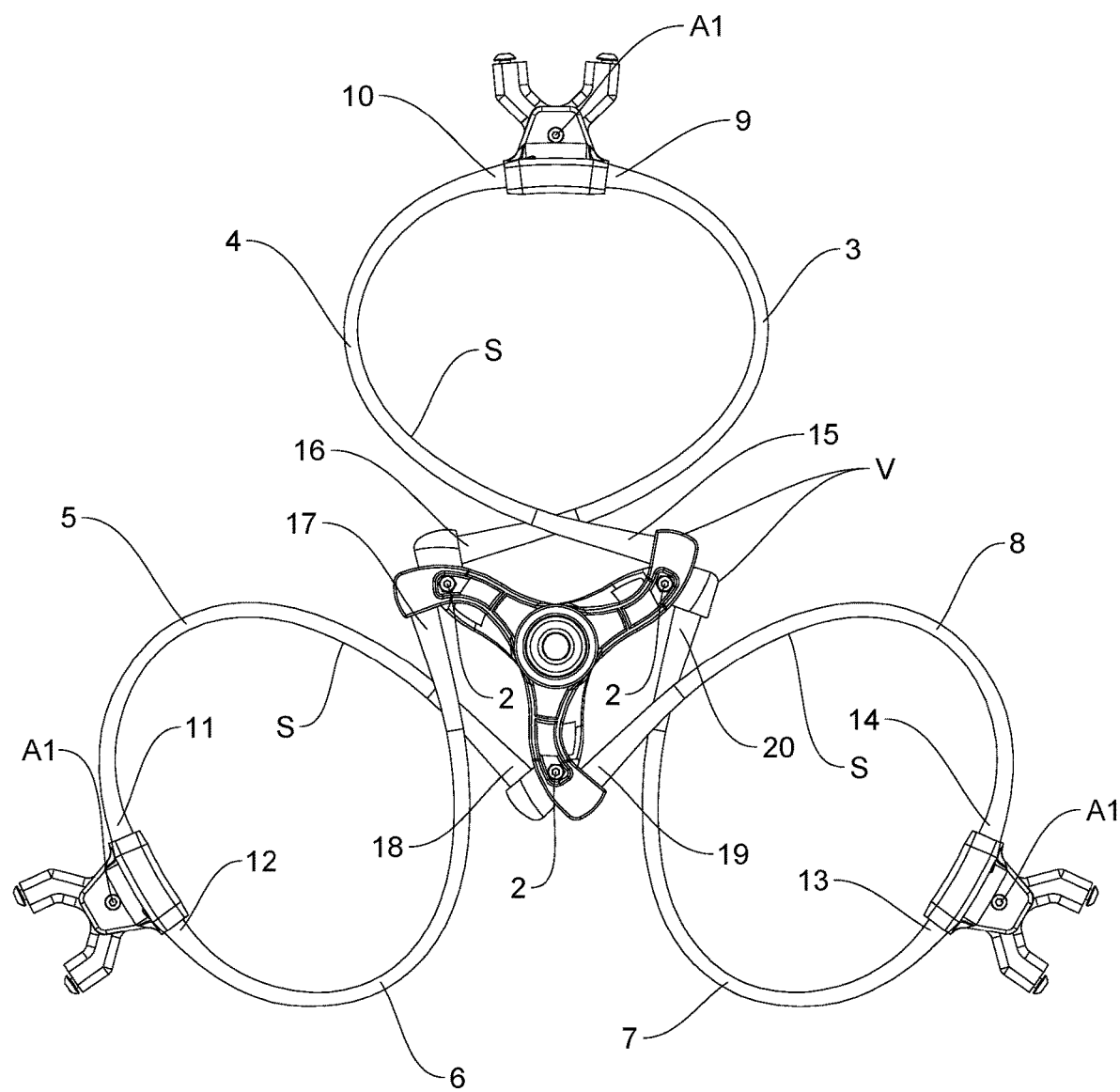
FIG. 2 illustrate front view of the wheel suspension system without the rim.

Referring to FIG. 1 and FIG. 2, in accordance with one embodiment of the present disclosure, there is provided a wheel suspension system (100) having a rim (R) which can be any ordinary rim generally used in a bicycle or similar vehicle. There are three adaptors (A) equidistantly mounted on the inner periphery of the rim, wherein each adaptor (A) is having a pair of legs (69 & 70 or 71 & 72 or 73 & 74) by way of which it is joined on to the inner surface of the rim (R) along its circumference. There are provided, in total, 3 elliptical suspension members inscribed within the rim (R), wherein each such elliptical suspension member (S) is having a pair of curved elastic suspension members (3 to 8), each having two ends (9-20), wherein one of its end (9-14) is configured to get secured into the adaptor (A) and the other end (15-20) is secured into a hub (H) provided at the centre of the rim (R). Therefore, the elliptical suspension members (S) equidistantly located within the rim (R) by way of infixing connection with the adaptors on the rim (R) periphery and hub (H). The hub (H) provided at the centre is having 2 layers interlocked with each other by way of their complementary structure connecting with each other, wherein each layer of the hub (H) is provided with 3 holders (V) as vertex extended away from its centre towards the rim (R). Further, the holders (V) of first layer (H1) of the hub (H) are interlocked with the holders (V) of the second layer (H2) of the hub (H), wherein the interlocking takes place by way of twisted complementary configuration of the holders (V) of the first layer with respect to holders (H) of the second layer. Further, other than the interlocking, the first and second layer of the hub (H) are joined with each by way of three bolting across the line of axis (2). Further, one of the ends (9 to 14) of the curved elastic suspension members (3 to 8) are configured to be received by the receivers (1.1) of the adaptors (A) from two sides along the circumference of the rim (R) and the other ends (15 to 20) of the curved elastic suspension members (3 to 8) are configured to be secured into the holders (V) of the hub (H).

Figure 3:
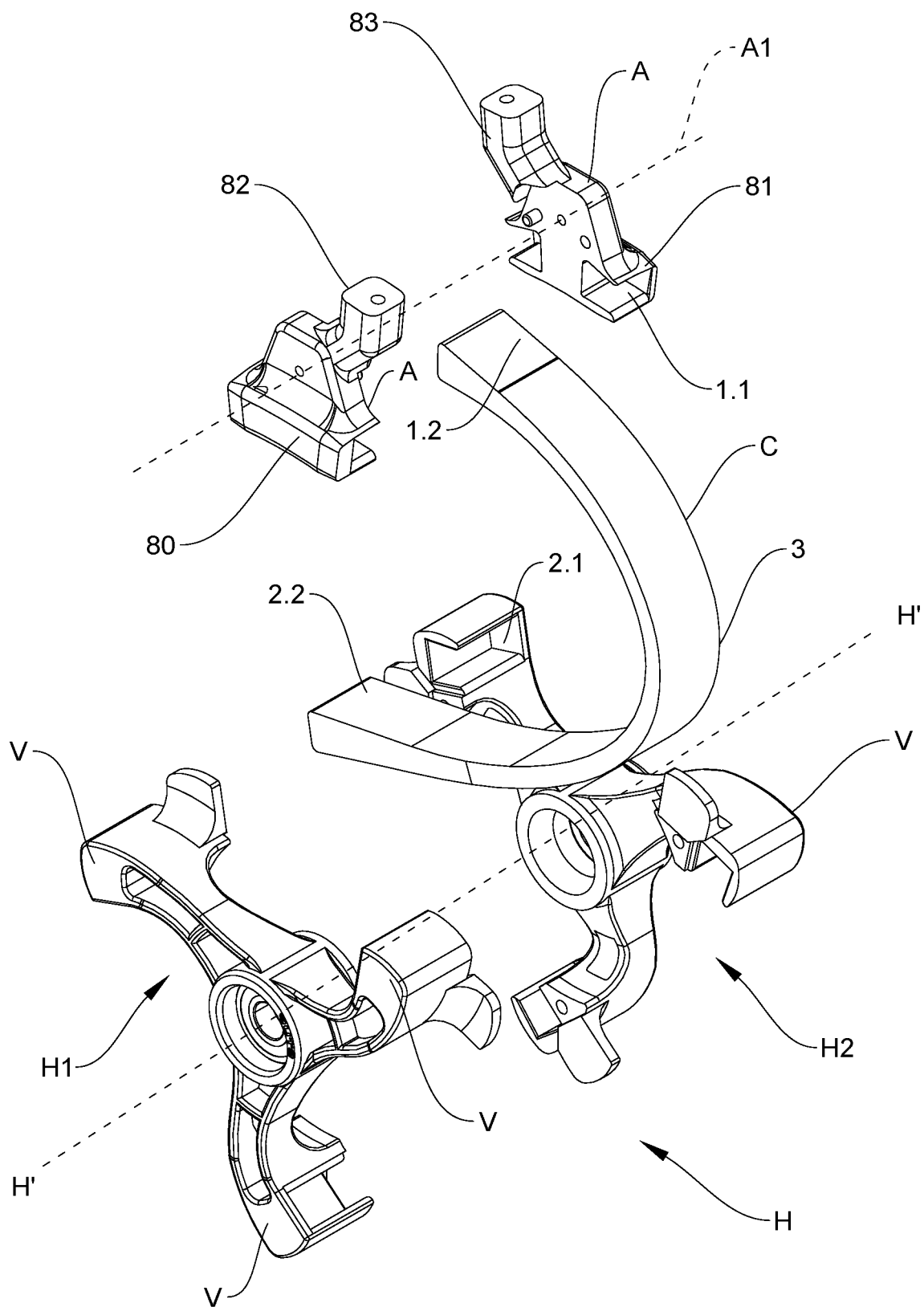
FIG. 3 illustrate an exploded view for joining of the suspension member with the hub and adaptor in one embodiment.

Referring to FIG. 3, in accordance with a preferred embodiment of the present disclosure, a curved elastic suspension member (C) having two ends (2.2 and 1.2), wherein one end (2.2) is secured into slots (2.1) of the holder (V) provided in each layer (H1 and H2) of the hub (H), wherein the other end (1.2) is secured into the groove of the receiver (1.1) of the adaptor (A), wherein the adaptor (A) is having a male member (8o) and a female member (81 attached to each other via fastening means along the axis (A1), each having a leg (69 & 70 or 71 & 72 or 73 & 74) and top members (82 and 83) extended above the legs, joined by way of the fastening means along the axis (A1). When, in the above configuration, the two ends (2.2 and 1.2) of all the elastic suspension members are secured, the positioning of all the elastic members is locked for providing an effective suspension to the wheel. Further, the height of said top members (82 and 83) above the receiver of the adaptors (A) can be varied as per the diameter of the wheel. This will enable absorbing shocks to be received by the wheel while it is moving on the road, thereby ensuring smooth movement of the wheel irrespective of the road surface for providing comfort to the rider. In this manner, the service life of the wheel is also enhanced.

Further, in the above embodiment, the first hub layer (H1) and second hub layer (H2) is attached to each other along the axis H' to form a bi-layered hub for holding one of the ends of the curved suspension elastic member (C), wherein the holders (V) at three vertex of the first layer hub (H1) for holding the ends of the elastic member (C) are oriented in clockwise direction whereas the holders (V) at three vertex of the second layer hub (H2) for holding the ends of the elastic member (C) are oriented in anti-clockwise direction. This orientation enables both the layer to get interlocked firmly with each other and supports formation of the elliptical structure (S) with the help of suspension elastic member (C) between the rim (R) and the and the hub (H).

Figure 4:
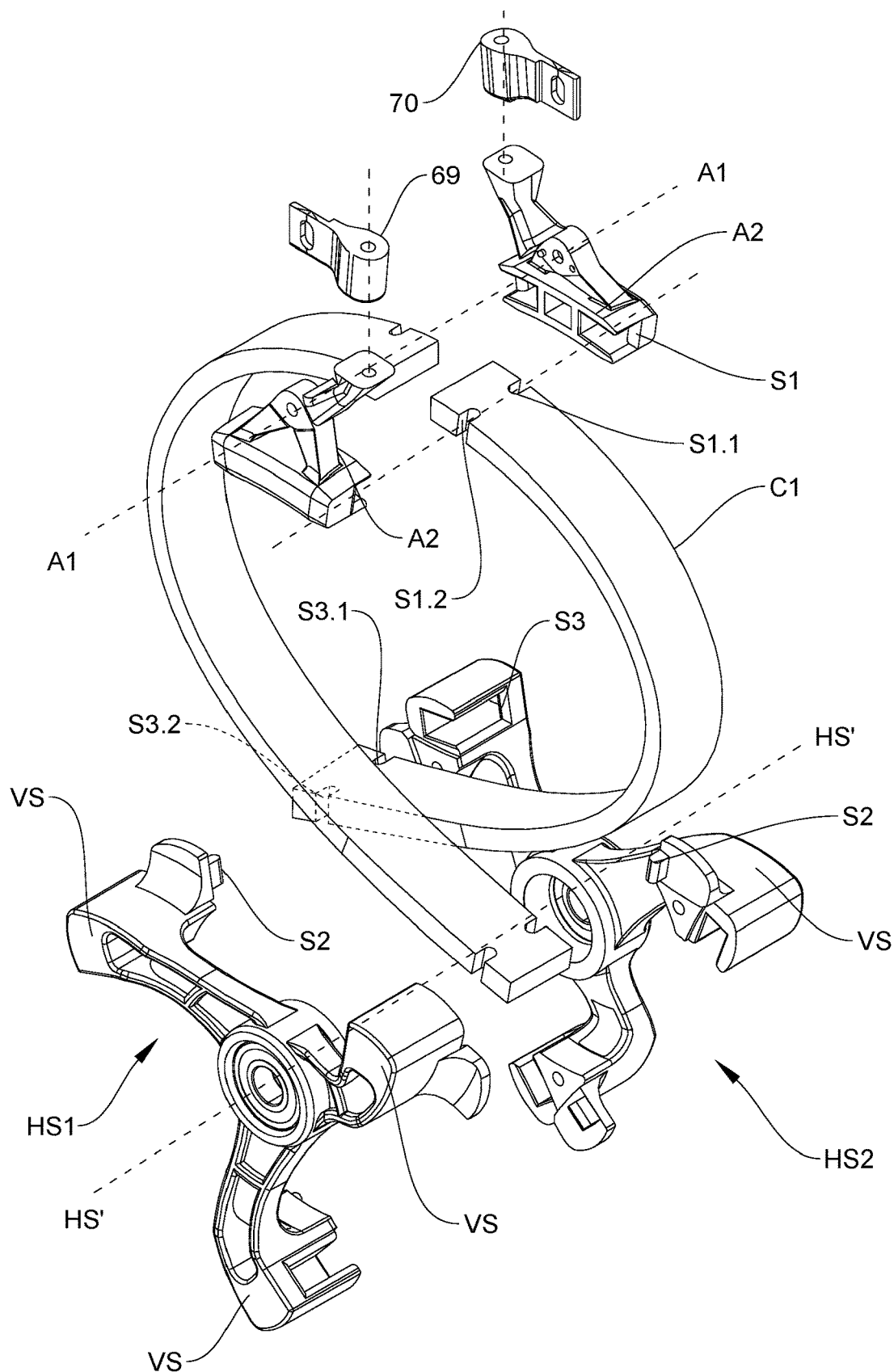
FIG. 4 illustrate an exploded view for joining of the suspension member with the hub and adaptor in another embodiment.

Referring to FIG. 4, in accordance with another preferred embodiment of the present disclosure, a curved elastic suspension member (Ci) having two ends, wherein one of the ends is provided with two slits (S1.1 and S1.2), wherein said slits are affixed into the grooves (S1) provided in the adaptor (A2), whereas the other end of the curved elastic suspension member (Ci) is also provided with two slits (S3.1 and S3.2), wherein one of the slits (3.1) is configured to be secured on to the slot (S3) of the holder (VS) and the other slit (not shown) is configured to be affixed on to the protrusion (S2) of the holder (VS) provided in each layer (HS1 and HS2) of the hub (H).

Figure 5:
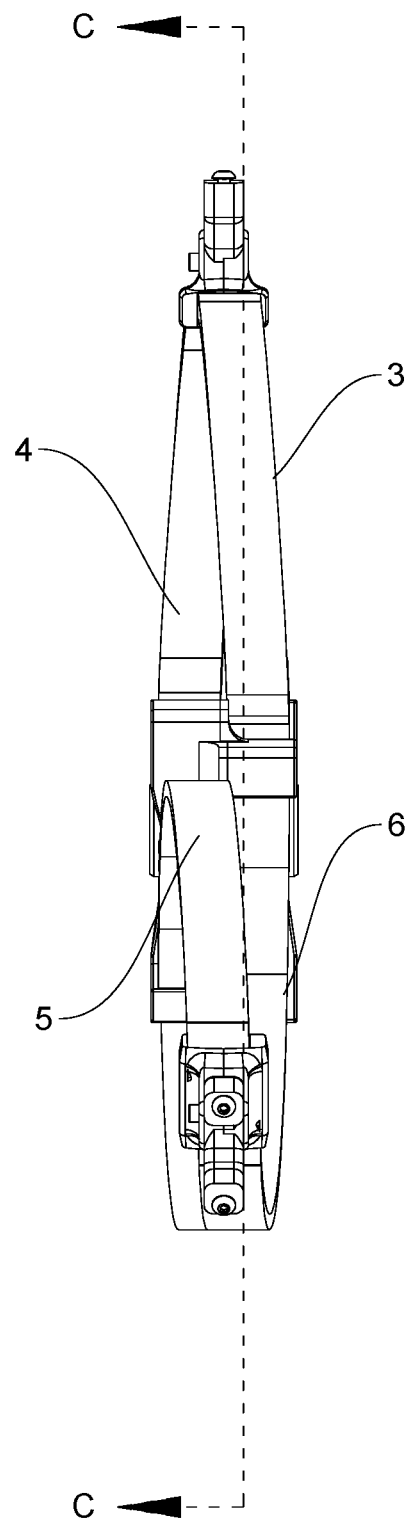
FIG. 5 illustrate the side view of the wheel suspension system without the rim along the section CC.

Referring to FIG. 5, a side view of the elliptical suspension members (S) arranged in accordance with one of the above embodiments along the section CC is shown, illustrating the curved elastic member (3, 4, 5 and 6) to be non-planar with respect to each other and oriented at angles enabling the elliptical suspension members (S) create a balanced distribution of stress and strain among them. This arrangement helps in appropriate compression and relaxation of the wheel suspension system for absorbing shocks. Therefore, the rider does not feel jerk or discomfort while crossing a breaker or potholes or any kind of non-uniformity on road while riding the vehicle or wheelchair.

Figure 6:
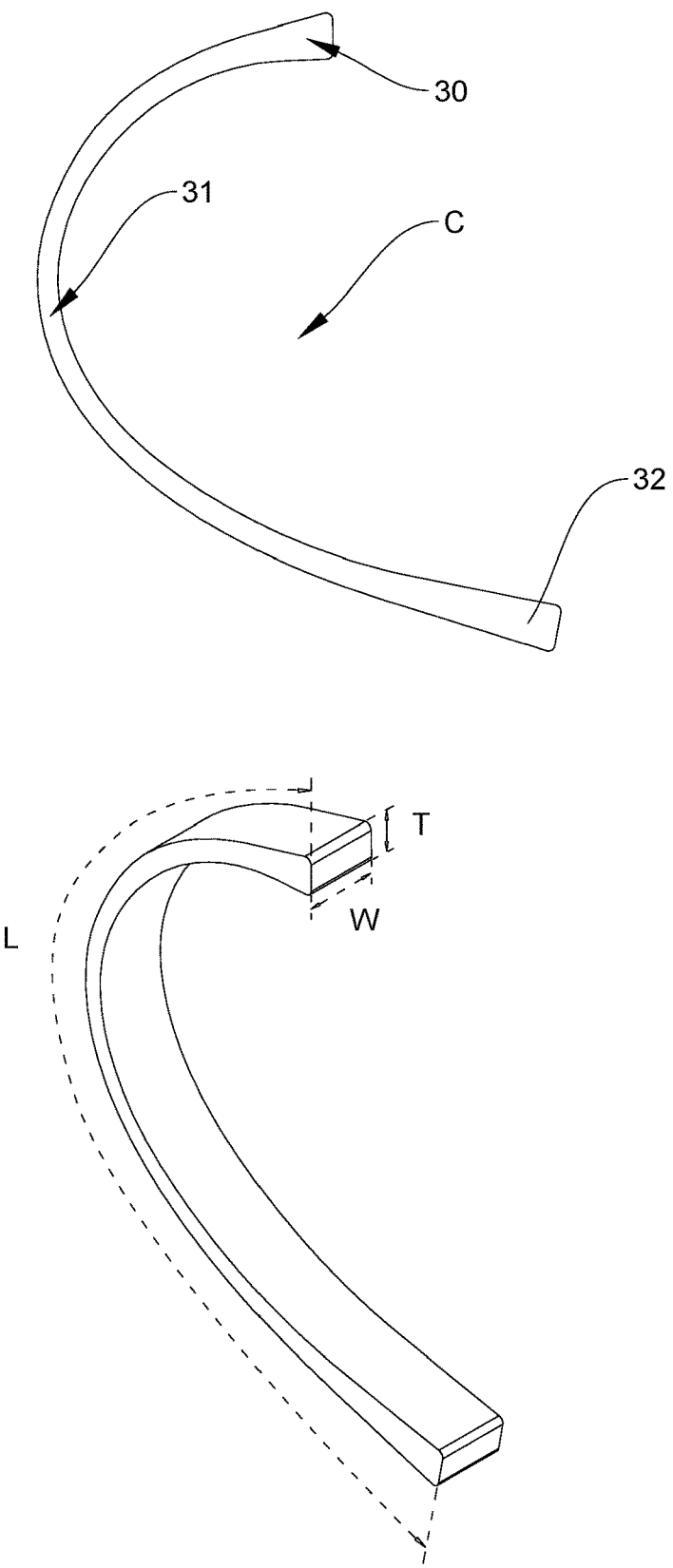
FIG. 6 illustrate a curved elastic suspension member in accordance with one preferred embodiment of the disclosure.

Referring to FIG. 6, a curved elastic member (C) to be used in a wheel suspension system (100) in one of the above preferred embodiments, is having drafted ends, i.e. having angular variation along the thickness, width and length at ends. It can be seen that the ends (30 and 32) are angularly dimensioned across their thickness (T) and width (W), and preferably, more than the remaining length (L) of the curved elastic member (C).

Figure 7:
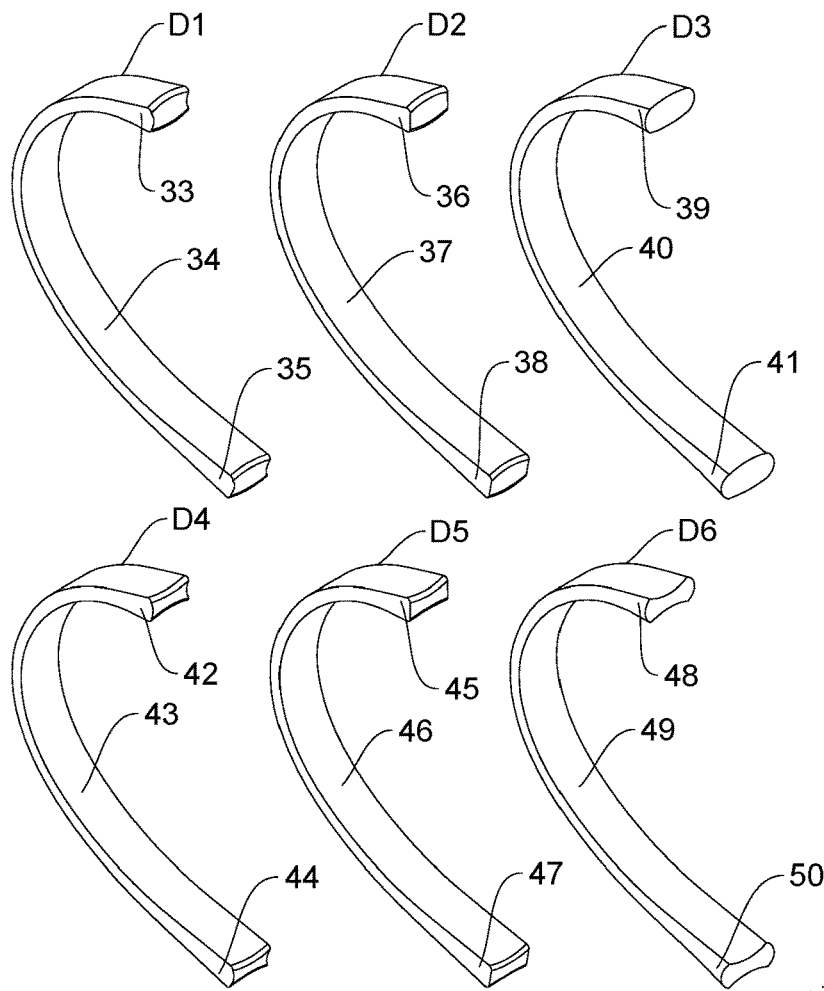
FIG. 7 illustrate a plurality of curved elastic suspension members in accordance with another preferred embodiment of the disclosure to be used as per the requirement.

Referring to FIG. 7, in accordance with one embodiment, a curved elastic member (D1) to be used in a wheel suspension system (100) of any of the above embodiments, wherein the ends (33 and 35) are drafted such that they are vertically bulged and horizontally depressed as compared to the remaining length (34) of the curved elastic member (D1).

Further, in another embodiment, a curved elastic member (D2) to be used in a wheel suspension system (100) of any of the above embodiments, wherein the ends (36 and 38) are drafted such that they are vertically bulged and horizontally same as the remaining length (37) of the curved elastic member (D2).

Further, in yet another embodiment, a curved elastic member (D3) to be used in a wheel suspension system (100) of any of the above embodiments, wherein the ends (39 and 41) are drafted such that their cross section becomes elliptical and not square like the remaining cross section (40) of the curved elastic member (D3).

Further, in yet another embodiment, a curved elastic member (D4) to be used in a wheel suspension system (100) of any of the above embodiments, wherein the ends (42 and 44) are drafted such that they are vertically depressed and horizontally same as the remaining length (43) of the curved elastic member (D4).

Further, in another embodiment, a curved elastic member (D5) to be used in a wheel suspension system (100) of any of the above embodiments, wherein the ends (45 and 47) are drafted such that they are vertically depressed from their outer sider and same as the remaining length on the inner side, and horizontally same as the remaining length (46) of the curved elastic member (D5).

Further in another embodiment, a curved elastic member (D5) to be used in a wheel suspension system (100) of any of the above embodiments, wherein the ends (45 and 47) are drafted such that they are vertically depressed from their outer side and same as the remaining length on the inner side, and horizontally same as the remaining length of the curved elastic member (D5).

Further, in another embodiment, a curved elastic member (D6) to be used in a wheel suspension system (100) of any of the above embodiments, wherein the ends (48 and 50) are drafted such that they are vertically depressed from both their outer side and inner side and horizontally bulged as compared to the remaining length (49) of the curved elastic member (D6).

Figure 8:
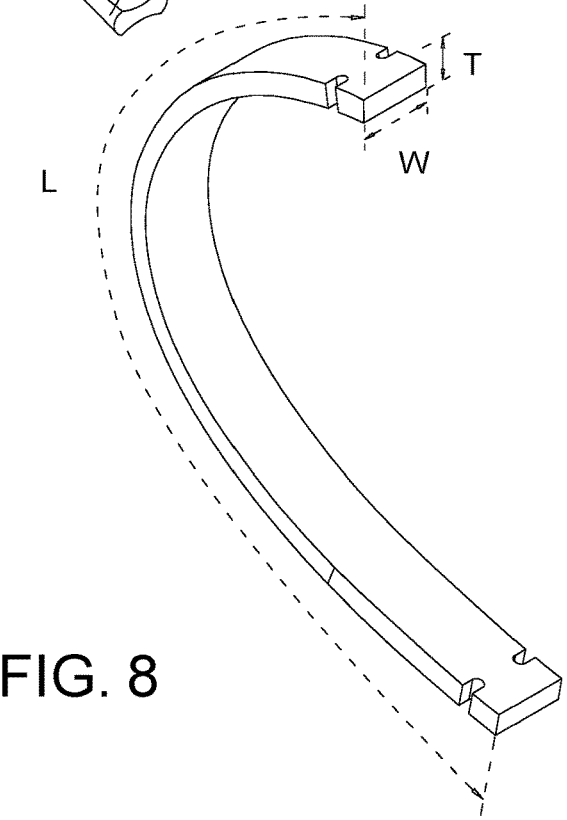
FIG. 8 illustrate a curved elastic suspension member with slitted ends.

Referring to FIG. 8, in accordance with one embodiment, a curved elastic member (C) to be used in a wheel suspension system (100) in one of the above preferred embodiments, is having slitted ends, i.e. having angular cut along the width (W) at ends.

Figure 9:
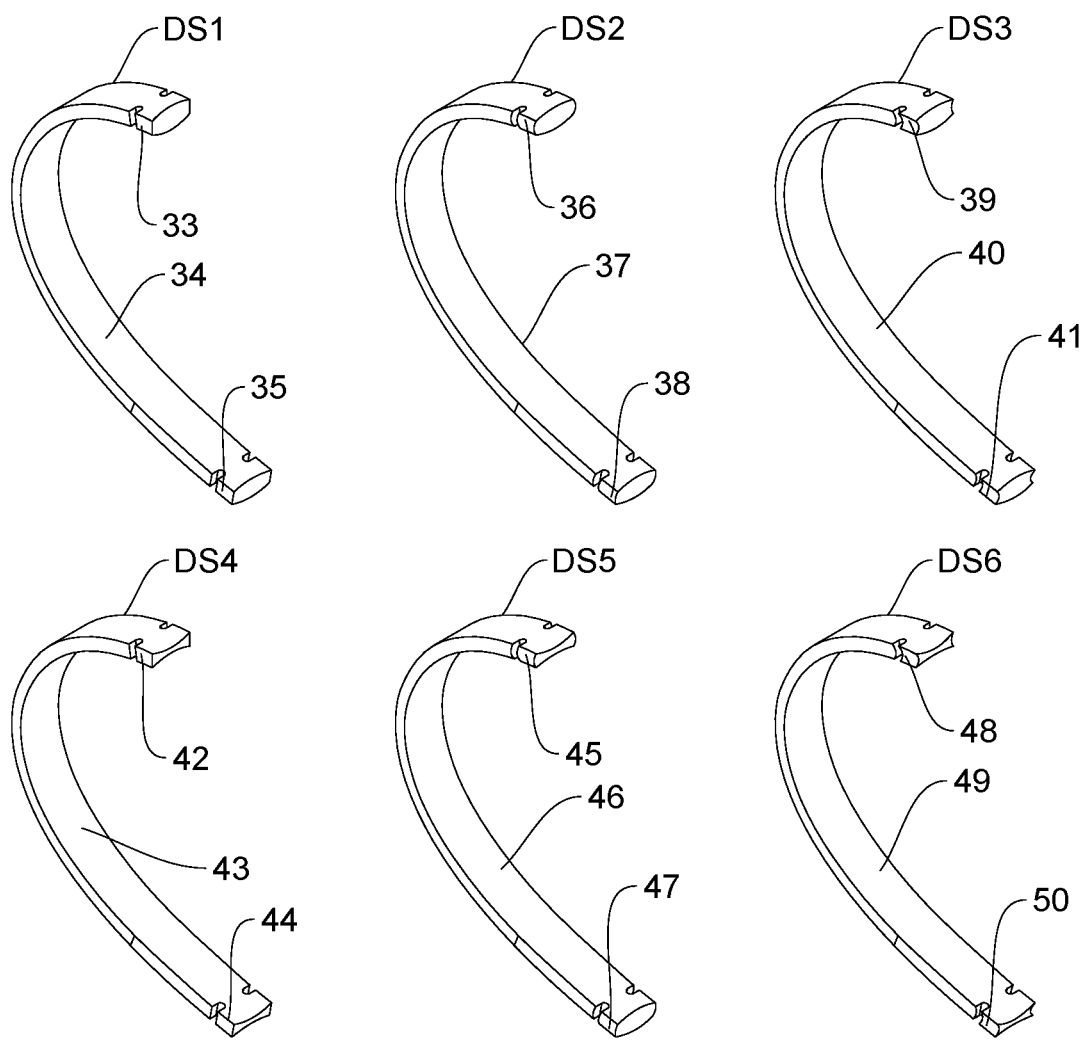
FIG. 9 illustrate a plurality of curved elastic suspension members with slitted ends to be used as per the requirement.

Referring to FIG. 9, in accordance with another embodiment, the curved elastic member (DS1, DS2, DS3, DS4, DS5 and DS6) are having slotted ends and the same configuration as disclosed in FIG. 7. The description for the configurations can be found above.

It will be appreciated by those skilled in the art that the foregoing description was in respect of preferred embodiments and that various alterations and modifications are possible within the broad scope of the appended claims without departing from the spirit of the disclosure with the necessary modifications.

Based on the description of disclosed embodiments, persons skilled in the art can implement or apply the present disclosure. Various modifications of the embodiments are apparent to persons skilled in the art, and general principles defined in the specification can be implemented in other embodiments without departing from the spirit or scope of the present disclosure. Therefore, the present disclosure is not limited to the embodiments in the specification but intends to cover the most extensive scope consistent with the principle and the novel features disclosed in the specification.

The invention claimed is:

1. A wheel suspension system (100), comprising:
a wheel rim (R);
a plurality of adaptors (A), each having a male member (80) and a female member (81), with a pair of legs (69, 70, 71, 72, 73, 74) to join on to an inner surface of the wheel rim (R) along its circumference, the plurality of adaptors (A) are equidistantly mounted on an inner periphery of the wheel rim (R);
a plurality of suspension curved elastic members (3 to 8) each having two drafted ends (9 to 20), wherein one of the drafted ends (9 to 14) of each of the members (3 to 8) is configured to be circumferentially disposed into an adaptor (A) of the plurality of adaptors (A), wherein an end (9 to 14) of each of the plurality the suspension curved elastic members (3 to 8) is secured into a groove formed by the male member (80) and the female member (81) of the adaptor (A);
a multi-layered hub (H) comprising a plurality of interlocked holders (V) having one or more slots extending away from a centre of the multi-layered hub (H) towards the wheel rim (R) for interlocking another end (15 to 20) of each of the plurality of suspension curved elastic members (3 to 8);
wherein each of the drafted ends (9 to 20) are having an angular variation along the thickness, width and length at ends.

2. The wheel suspension system as claimed in claim 1, wherein the drafted ends (9 to 20) of each of the suspension curved elastic members (3 to 8) are having a thickness greater or lesser than a thickness of a remaining portion (L) of each of the elastic members (3 to 8) for interlocking the suspension member (3 to 8) with the multi-layered hub (H) and the adaptor (A).

3. The wheel suspension system as claimed in claim 1, wherein the drafted ends (9 to 20) of each of the suspension curved elastic members (3 to 8) are having a width greater or lesser than a width of a remaining portion (L) of each of the elastic members (3 to 8) for interlocking with the multi-layered hub (H) and the adaptor (A).

4. The wheel suspension system as claimed in claim 1, wherein the drafted ends (9 to 20) of each of the suspension curved elastic members (3 to 8) are having a width or thickness greater or lesser than a thickness or a width of the slot of the holder (V) and a groove (S1) of a receiver (1.1) of the adaptor (A) for interlocking with the multi-layered hub (H) and the adaptor (A).

5. The wheel suspension system as claimed in claim 1, wherein each of the suspension curved elastic members (3 to 8) has a varying thickness along its circumference and length at ends.

6. The wheel suspension system as claimed in claim 1, wherein each of the suspension curved elastic members (3 to 8) has a varying width along its circumference.

7. The wheel suspension system as claimed in claim 1, wherein the drafted ends (9 to 20) of each of the suspension curved elastic members (3 to 8) are provided with one or more slits (S1.1 and S1.2) having structure complementary to the structure of receivers (1.1) of the adaptor (A) and the slots (2.1) of the holder for interlocking with the multi-layered hub (H) and the adaptor (A).

8. The wheel suspension system as claimed in claim 1, wherein the drafted ends (9 to 20) of each of the suspension curved elastic members (3 to 8) are solid ends having structure complementary to structure of grooves (S1) of receivers (1.1) of the adaptor (A) and the slots (2.1) in the holder (V) for interlocking with the multi-layered hub (H) and the adaptor (A).

9. The wheel suspension system as claimed in claim 1, wherein each of the suspension curved elastic members (3 to 8) has one end (2.2), wherein the one end (2.2) is secured into slots (2.1) of the holder (V) provided in each layer (H1 and H2) of the multi-layered hub (H).

10. The wheel suspension system as claimed in claim 1, wherein each of the interlocked holder(V) is directed in a plane different to other holders.

11. The wheel suspension system as claimed in claim 1, wherein the each of the suspension curved elastic members (3 to 8) has a C-shape.

12. The wheel suspension system as claimed in claim 1, wherein a pair of the suspension curved elastic members (3 to 8) are oppositely arranged and disposed into—respective receivers (1.1) of the adaptor (A) and respective interlocked holders (V).

13. The wheel suspension system as claimed in claim 1, wherein a pair of the suspension curved elastic members (3 to 8) when disposed oppositely into respective receivers (1.1) of a respective adaptor (A) and respective interlocked holders (V), together forms an elliptical structure between the wheel rim (R) and the multi-layered hub (H).

14. The wheel suspension system as claimed in claim 1, wherein the multi-layered hub (H) is configured to mount a brake and/or gears and/or sprocket arrangement.

\* \* \* \* \*